Jan. 19, 1954  C. W. JONES  2,666,903
CAVITY COUPLING TO WAVE GUIDE
Filed Sept. 20, 1945

INVENTOR
CLARENCE W. JONES
BY
ATTORNEY

Patented Jan. 19, 1954

2,666,903

UNITED STATES PATENT OFFICE 2,666,903

CAVITY COUPLING TO WAVE GUIDE

Clarence W. Jones, Boston, Mass.

Application September 20, 1945, Serial No. 617,583

10 Claims. (Cl. 333—24)

The present invention relates to the electrical coupling together of electromagnetic wave controlling structures, and in particular to improvements in means for coupling a resonant cavity to a wave guide through an opening in the side thereof.

The means proposed are hereinafter applied to the specific problem of coupling a cylindrical resonant cavity to the narrow side of a rectangular wave guide. It will be apparent, however, that the principles of this invention may be employed in the solution of numerous other problems of the general character indicated above.

The coupling of a cylindrical resonant cavity to a rectangular wave guide is customarily made by affixing the cavity to a narrow side of the wave guide and providing a common opening in the side of the wave guide and in the cavity through which electromagnetic wave energy may pass from the wave guide to the cavity and vice versa. The longitudinal axis of the resonant cavity customarily and usually lies in a direction transverse to the narrow side of the wave guide or mutually perpendicular with the longitudinal axis of the wave guide. The length of the passage constituted by the aforementioned common opening is of importance in that a long passage will behave like a wave guide beyond cutoff, and waves passing through the passage will be attenuated therefore. The cross sectional size of the passage is also of importance, a relatively small opening being desirable.

It is an object of my invention to provide coupling means between a resonant cavity and a rectangular wave guide which includes a small iris or passage having very shallow depth.

It is a further object of my invention to provide such coupling means as will embody a passage lying substantially in a plane parallel to the plane of the side of the wave guide on which the cylindrical cavity is mounted.

It is a further object of my invention to provide such coupling means that will include an impedance matching and reflection eliminating device to facilitate the free passage of energy from the wave guide to the resonant chamber and vice versa.

Other objects and features of my invention will become apparent upon a careful consideration of the following detailed description when taken together with the accompanying drawings the fingers of which illustrate a typical embodiment of the invention.

Figure 1:
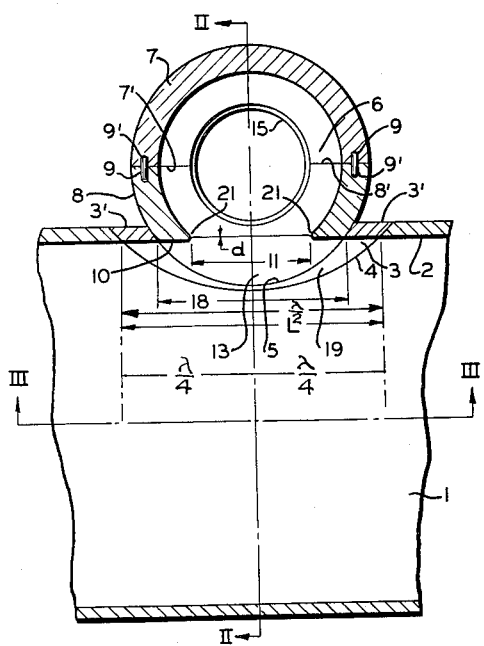
Fig. 1 illustrates in cross section a cylindrical cavity mounted upon a side of a rectangular wave guide in accordance with my invention.
Figure 4:
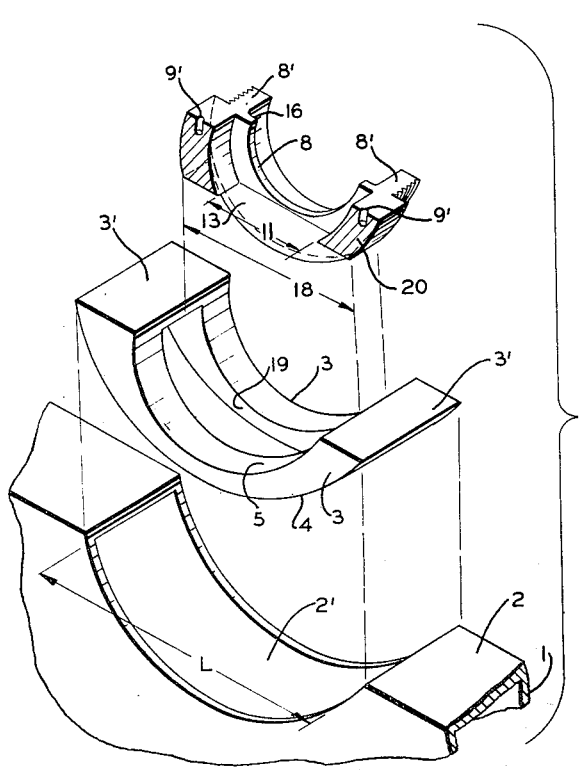
Fig. 4 is a partial exploded view partially in section of the apparatus of my invention showing the parts thereof in spaced relationship to each other.

Referring now to Figs. 1 and 4 a rectangular wave guide 1 has an opening 2' of length L cut into a narrow side 2 thereof. The length L is substantially equal to one half a wave length of the energy being carried in the wave guide 1. An arcuately shaped bushing 3, having curved surfaces 4 and 5 of two different radii of curvature, is placed in the aforementioned opening 2' in the side 2. The surfaces 4 of larger curvature just fill the opening 2' longitudinally, and extend longitudinally along the wave guide 1 a distance L substantially equal to one half a guide wave length of the energy being carried therein. The surfaces 5 of smaller curvature are curved to accept a cylindrical structure 6, which comprises the elements of a cylindrical resonant cavity. The cylindrical resonant cavity structure 6 is made in two semicylindrical halves 7 and 8 which have abutted matching surfaces 7' and 8' and may be held together by threaded collars 14 on the sides thereof as will be explained hereinbelow, in connection with Fig. 2. The two halves 7 and 8 are aligned when being placed together by aligning pins 9 in suitable holes 9' in the two halves 7 and 8 provided therefor. The lower half 8 of the cylindrical structure 6 rests in arcuate structure of the bushing 3, being proportioned to mate with the side 5 having the smaller radius of curvature. The lower half 8, the bushing 3, and the wall 2 of the wave guide 1 are all fastened together by means of solder or other suitable electrical and mechanical connecting means. A portion of the lower half 8 of the cylindrical structure 6 is cut away along a chord 10, leaving an opening therein of length 11. The line of the chord 10 is substantially flush with the inner side of the wall 2 of the wave guide 1 and with the inner surfaces of the flat portions 3' of the arcuate bushing 3, so that the inner surface of the wall 2 of the wave guide 1 is continuous to the opening in the lower portion 8 of the cylindrical structure 6. It will be understood that along the chordal line between edges 21 the electrical field will be common to both the resonator and the wave guide. Therefore, it is impossible to state accurately as far as these fields are concerned where the cavity resonator ends and where the wave guide begins. However, the physical structure may be described without ambiguity if it is considered that the wave guide terminates in a plane coincident with the inner surface of the narrow wall and the resonator terminates at the chordal plane passing through the intersection of the rounded portion of edges 21 with the inner cylindrical surface of the resonator. This method of describing the physical structure is used throughout the specification and claims. The opening of length 11 thus has a thickness which is relatively small and may be infinitesimal if edges 21 are not rounded or are rounded only slightly. It may be said that the opening is substantially an iris of depth or thickness $d$ as shown in Fig. 1. The edges 21 formed at the iris opening by cutting the lower half 8 along a chord 10 are rounded slightly to avoid arcing. The plane of the iris opening may be contiguous with or preferably slightly displaced from the plane of the inner surface of the narrow wall 2 of the wave guide 1. This latter adjustment is controlled by the manner in which the edges 21 are shaped. As shown in Fig. 1, these edges 21 are rounded and shaped to displace the plane of the iris opening outwardly with respect to the wave guide 1. One but not the only preferred outward spacing for the plane of the iris opening from the inner surface of the narrow wall 2 is 0.040 inch.

Figure 2:
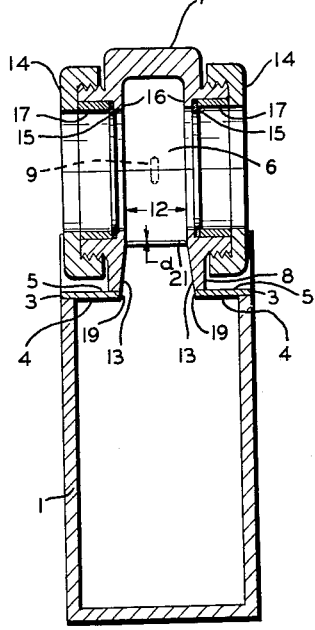
Fig. 2 is a cross section taken along line 2—2 of Fig. 1.

Referring now to Fig. 2, the cross sectional view of that figure shows more clearly the structure of the coupling means of my invention. The opening of the iris opening of dimensional thickness "$d$" is shown here to have a width 12. The lower walls 13 of the lower half 8 of the cylindrical cavity structure 6 depending from the iris opening are sloped away from the opening to provide more favorable transfer of energy between the wave guide 1 and the cylindrical cavity 6. The lower half 8 of the cylindrical cavity 6 is shown resting upon the upper surfaces 5 of the arcuate portions of the bushing 3. Rings 14 are threaded to the two halves 7 and 8 of the cylindrical cavity 6 and hold these two halves 7 and 8 together. Resilient washers 15, which may be of leather or other suitable material, are held by annuli 17 against abutments 16 formed upon the inner surfaces or walls of the cylindrical cavity structure 6. The annuli 17 are further held against the resilient washers 15 by the threaded rings 14. The structure comprising the washers 15, the annuli 17, and the threaded rings 14 is used to hold in place in the cavity of the cylindrical structure 6 a glass enclosed spark gap (not shown) of the type commonly used with cylindrical resonant cavities of this sort. It will be noticed from the illustration of Fig. 2, that the arcuate portions of the bushing 3 shown therein form a part of the side boundaries of the iris opening between the wave guide 1 and the cylindrical cavity structure 6, and the sides 19 thereof are sloped in the same manner as the walls 13 of the lower half 8 of that structure 6.

Figure 3:
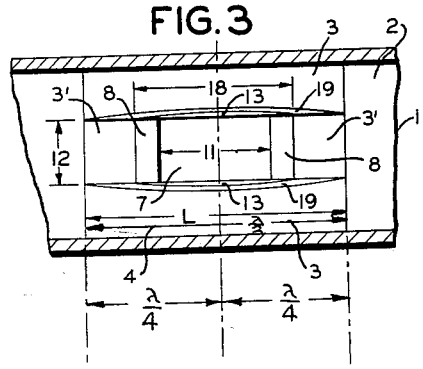
Fig. 3 is a cross section taken along line 3—3 of Fig. 1.

Fig. 3 illustrates the appearance of the iris opening, showing the long dimension 11 and the short dimension 12 thereof, and the dimension L parallel to the longitudinal axis of the wave guide 1 of the arcuate portions of the bushing 3. These inwardly intruding arcuate portions of the bushing 3 extend along the longitudinal axis of the wave guide 1 substantially one quarter of a wave length of energy at the operative frequency in each direction from the midpoint of a long side of the aforementioned iris opening. A shorter dimension 18 is the dimension parallel to the longitudinal axis of the wave guide 1, of the junction of the cylindrical resonant cavity structure 6 and the arcuate bushing 3. The inner side walls 13 of the lower half 8 of the cylindrical cavity structure 6 are shown and with them the contiguous inner side walls 19 of the arcuate bushing 3. The short dimension 12 of the iris opening is made substantially smaller than the width of the narrow wall 2.

The exploded view of the apparatus of my invention shown in Fig. 4 shows the parts illustrated in the Figs. 1, 2, and 3 in greater detail and in perspective. The wave guide 1 has an arcuate opening 2' cut in the upper wall 2 thereof. The arcuately shaped bushing 3 having rectangular flat members 3' is formed to fit the opening 2', all substantially as described hereinabove. The arcuate sides 4 of longer radius of curvature fit the opening 2' in the wall 2 of the rectangular wave guide 1. The arcuate sides 5 having a smaller radius of curvature are adapted to fit the lower half 8 of the cylindrical resonant chamber structure 6. As illustrated in Fig. 4, only a portion of the lower half 8 of the cylindrical resonant cavity structure 6 is shown and that portion is shown in cross section. The portion of the lower half 8 that is shown in Fig. 4 corresponds to the right-hand half of the lower half 8 as shown in Fig. 2. The length of the iris opening 11 also is apparent from the isometric view of the lower half 8 of the cylindrical cavity structure 6. It will be apparent that when the three portions of my invention, the rectangular wave guide 1, the arcuate bushing 3, and the lower half 8 of the cylindrical cavity structure illustrated in Fig. 4, are put together, the apparatus as illustrated in Figs. 1, 2, and 3 will be had.

The operation of the apparatus of my invention is simple. Electromagnetic energy being carried in the wave guide 1 will pass into the thereunto resonant cavity of the cylindrical structure 6 through the iris opening between the wave guide 1 and the resonant cavity structure 6. The iris opening has substantially an infinitesimal depth "$d$", and therefore, does not provide a wave guide passage of the nature of a wave guide operated beyond its cut-off frequency between the rectangular wave guide 1 and the resonant cylindrical cavity structure 6. Thus attenuation in such a passage, as is found in prior art structures of this sort, is avoided. In order to avoid reflection of waves by the intruding portions of the bushing 3, the arcuate surfaces 4 of the bushing 3 extend a length L along the wave guide 1 substantially equal to one-half the length of a wave of the energy being carried in the wave guide 1 as aforementioned. Thus energy reflected from one end of the bushing 3 will substantially mutually cancel with energy reflected from the other end thereof. This action tends to inhibit the formation of undesirable standing waves in the wave guide 1. Thus, since these arcuate portions of the bushing 3 act to cancel reflections, they are in this sense impedance matching devices. Further, as aforementioned, it is preferred to space the plane in which the iris opening lies outwardly from the inner surface of the wall 2 of the wave guide 1 a small distance. When a satisfactory spacing is had as one in the neighborhood of 0.040 inches arc-over will be further diminished and impedance matching will be even more greatly improved.

Thus I have provided in the improvements of my invention an iris opening having substantially infinitesimal depth and dimensions smaller than the wall of the wave guide in which it is installed.

I have further provided means for inhibiting the formation of arc-overs and for improving the impedance match between a rectangular wave guide and a resonant cylindrical cavity.

Although I have shown and described only a certain specific embodiment of my invention, I am fully aware of the many modifications possible thereof. It is understood that dimensions set forth are not the only useable dimensions. Therefore this invention is not to be limited except insofar as is necessitated by the prior art and the spirit of the appended claims.

I claim:

1. In combination with a wave guide, a cavity resonator and an adapter for facilitating coupling between said resonator and said wave guide, said adapter having arcuately shaped portions which penetrate a top wall of said wave guide and form a continuation thereof, and inwardly facing longitudinal planar surfaces of said adaptor defining an opening therethrough for the passage of energy, the outer arcuate surface thereof forming a continuation of said top wall of the wave guide around said opening.

2. In combination with a rectangular wave guide, a substantially cylindrical cavity resonator having first and second separable portions of substantially similar construction, and means for the transfer of energy between said resonator and said wave guide comprising, an adapting member attached to and penetrating a side wall of said wave guide, said adapting member having a semicylindrical shape and being adapted for containing said first portion of said cavity resonator, said member and said first portion having aligned openings, said second portion of said cavity resonator being affixed to and detachable from said first portion.

3. In combination with a rectangular wave guide, a cavity resonator of substantially cylindrical cross-section, said resonator being axially split into two substantially similar portions, and means for coupling energy between said wave guide and said resonator comprising an adapting member inserted in a side wall of said wave guide and having a substantially rectangular passage therethrough, said adapting member forming a part of said wave guide and having arcuately shaped portions extending inwardly into said wave guide adjacent the long dimensions of said rectangular opening, the first portion of said cavity resonator having an outer surface conforming with the outwardly facing surface of said adapting member and being insertable therein, said first portion also having a rectangular passage therethrough in register with said first-mentioned passage, said second portion of said cavity resonator being detachably secured to said first portion.

4. In combination, a rectangular wave guide joined to a cylindrical cavity resonator, said wave guide and said cavity resonator having a mutual opening of substantially rectangular cross section formed therebetween, said opening lying in a chordal plane of said cylindrical cavity resonator, which plane includes the inner surface of a wall of said wave guide.

5. Apparatus as in claim 4 wherein said rectangular opening is disposed relative to said wave guide such that two sides of said opening are parallel to the longitudinal axis of said wave guide, said apparatus including projections extending into said wave guide adjacent said two sides of said wave guide.

6. In combination, a rectangular wave guide joined to a cylindrical cavity resonator, said wave guide and said cavity resonator having a mutual opening of substantially rectangular cross section formed therebetween, said opening lying in a chordal plane of said cylindrical cavity resonator, which plane includes the inner surface of a wall of said wave guide, the long sides of said rectangular opening being parallel to the longitudinal axis of said wave guide, and arcuate projections adjacent said long sides extending into said wave guide, the surfaces of said arcuate projections forming substantially a continuation of a surface of said cavity resonator.

7. Apparatus as in claim 6 wherein said arcuate projections are each of a length equal to half a wavelength of energy at the operating frequency of said wave guide, the midpoints of said arcuate projections being disposed in the same plane perpendicular to the longitudinal axis of said wave guide which includes the midpoints of said long sides of said rectangular opening.

8. In combination, a rectangular wave guide joined to a cylindrical cavity resonator, said wave guide and said cavity resonator having a mutual opening of substantially rectangular cross section formed therebetween, said opening lying in a chordal plane of said cylindrical cavity resonator, which plane includes the inner surface of a wall of said wave guide, the long sides of said rectangular opening being parallel to the longitudinal axis of said wave guide, and arcuate projections extending into said wave guide adjacent said long sides, the volume of each of said arcuate projections being substantially determined by two parallel planes perpendicular to said rectangular opening and parallel to the longitudinal axis of said wave guide intersected by two cylindrical surfaces of different diameters, said cylindrical surfaces having parallel axes lying in a third plane perpendicular to said rectangular opening and to said two parallel planes.

9. In combination, a rectangular wave guide having an opening formed in the side thereof, the edges of said opening lying on a cylindrical surface having an axis perpendicular to the planes of the broad walls of said wave guide and intersecting said planes at a point displaced from said wave guide, a bushing in the form of a cylindrical segment joined to said wave guide, said bushing having an inner cylindrical surface conforming to and disposed in contact with the sides of said opening in said wave guide, said bushing having an outer surface defined at an intermediate section by a second cylindrical surface having elements thereof parallel to elements of said inner cylindrical surface, said bushing having a groove formed therein defined by a plane coincident with the inner surface of a narrow wall of said wave guide and two planes approximately parallel to the broad walls of said wave guide, said groove extending to a greater depth than the thickness of the central portion of said bushing thereby to form an opening therein, a cavity resonator having first and second end plates and a cylindrical wall joining said end plates, said end plates being disposed in planes substantially parallel to the broad walls of said wave guide and in contact with said outer cylindrical surface of said bushing, said end plates being formed to conform to the shape of said outer cylindrical surface, said cylindrical wall of said resonator being terminated by a chordal plane which is coincident with the inner surface of said narrow wall of said wave guide, whereby a rectangular opening of substantially infinitesimal depth is formed between said resonator and said wave guide.

10. Means for coupling electrical energy between a cavity resonator and a wave guide comprising, a mutual opening in said resonator and said guide and a metallic bushing positioned between said resonator and said guide shaped and adapted to fit snugly against the boundary structure of said opening and in fixed mechanical contact therewith, said opening forming a passage of substantially infinitesimal depth between said resonator and said guide for transferring electric energy therebetween, said passage being substantially rectangular in shape and said bushing having substantially mutually parallel portions projecting arcuately into said wave guide and substantially bounding said opening along the longer edges thereof, said portions extending along the inner wall of said guide a distance substantially equal to one quarter wave length of said electric energy in each direction from the midpoints of said edges.

CLARENCE W. JONES.

References Cited in the file of this patent

UNITED STATES PATENTS

| Number | Name | Date |
|---|---|---|
| 2,200,023 | Dallenbach | May 7, 1940 |
| 2,409,913 | Tonks | Oct. 22, 1946 |
| 2,412,446 | De Walt | Dec. 10, 1946 |
| 2,421,912 | Spooner | June 10, 1947 |
| 2,430,130 | Linder | Nov. 4, 1947 |
| 2,442,118 | Donal et al. | May 25, 1948 |
| 2,466,136 | Tuller | Apr. 5, 1949 |
| 2,479,697 | Norton | Aug. 23, 1949 |
| 2,485,029 | Bradley | Oct. 18, 1949 |
| 2,530,691 | Fox | Nov. 21, 1950 |